Feb. 21, 1967      D. S. MEEK      3,305,130

CARTON ACCUMULATING APPARATUS

Filed Jan. 17, 1966      9 Sheets-Sheet 1

FIG_1

INVENTOR
DONALD S. MEEK

BY *Francis W. Anderson*

ATTORNEY

United States Patent Office 3,305,130
Patented Feb. 21, 1967

3,305,130
CARTON ACCUMULATING APPARATUS
Donald S. Meek, Saratoga, Calif., assignor to FMC Corporation, San Jose, Calif., a corporation of Delaware
Filed Jan. 17, 1966, Ser. No. 521,161
9 Claims. (Cl. 221—175)

The present invention pertains to packaging machines and more particularly relates to an apparatus for accumulating a supply of containers, such as cartons, in two rows and for presenting the cartons at a discharge point in each row for independent discharge from each row upon demand from a carton receiving mechanism.

The carton accumulating apparatus of the present invention is intended for use in carton forming and filling machines of the type disclosed in the copending application of Leslie Vadas et al., Serial No. 461,738 which application was filed on June 7, 1965 and is assigned to the assignee of the present invention.

It is one object of the present invention to provide an improved carton accumulating apparatus.

Another object is to provide a carton accumulating apparatus which reliably deposits cartons in two vertical columns.

Another object is to provide an accumulating apparatus adapted to receive cartons from transfer points at different elevations.

Another object is to provide an adjustable carton accumulating apparatus adapted to handle cartons of several different sizes.

These and other objects and advantages of the present invention will become apparent from the following description and the accompanying drawings, in which:

FIGURE 2 is an enlarged perspective illustrating the lower end of the accumulating apparatus associated with a portion of a carton forming turret, certain parts being cut away.

In general, the carton accumulating apparatus 20 (FIGS. 1 and 2) of the present invention receives cartons C, which may be quart, pint, one-third quart or one-half pint cartons, with their bottom closures sealed from an upper series 22 and a lower series 24 of mandrels 26 which are mounted on a turret 28 that intermittently indexes the cartons at an accumulator loading station 30. A reciprocable accumulator loading mechanism 32 then strips the cartons from the mandrels 26 and places them in the accumulator in position to be engaged by a lower accumulator conveyor 34 and an upper accumulator conveyor 36. The accumulator conveyors 34 and 36 move the cartons C along two rows past a plurality of ultraviolet sterilizing units 38 of a sterilizer 39 (FIGS. 1, 7 and 12) and then releases the cartons for accumulation into two vertical columns in guideways 40 and 40a (FIG. 7) respectively. The lowermost carton in each column is then disposed in position to be deflected out of the accumulating apparatus 20 by independently operated reciprocable pushers 42, only one pusher being shown in FIGURE 1.

More particularly, after the turret 28 indexes an upper and a lower mandrel 26 into the accumulator loading station 30 with a carton on each mandrel having its lower end closed and disposed radially outward of the turret, the accumulator loading mechanism 32 engages the two cartons at Station 30 and strips them from the mandrels and places them in the accumulating apparatus in position to be received by the conveyors.

The accumulator loading mechanism 32 (FIGS. 1 to 5) comprises a mandrel unloading carrier 44 which strips the cartons from the mandrels, and a carton transfer carrier 46 which transfers the cartons that have been stripped from the lower series of mandrels, from an intermediate position below the path of movement of the upper accumulator conveyor 36 to a position in the path of movement of the lower accumulator conveyor 34. The carriers 44 and 46 are slidably supported on a shaft 48 that is supported a short distance above the turret and accumulator supporting frame 50 on pedestals 52 and 54, the pedestal 54 being disposed below the path of movement of the lower series of mandrels 26.

The carriers 44 and 46 are held from rotation about the shaft 48 by cam followers 56 and 58, respectively, journalled thereon and slidably received between spaced plates 60 and 62 (FIG. 4) which define a cam track 64. The plates 60 and 62 are held in spaced parallel relationship to each other and to the shaft 48 by cap screws 66 which extend through the plates, through spacers 69, and are screwed into pedestals 70 which are supported by the frame 50.

The mandrel unloading carrier 44 is generally L-shaped (FIG. 4) and has a lower horizontal portion 77 to which the cam follower 56 is journalled and includes a vertical arm 78 projecting upwardly from the shaft 48. Four carton engaging stripper fingers 79, 81, 82 and 83 are pivotally mounted on the vertical arm 78, the fingers 79 and 81 cooperating to strip the cartons from the upper mandrel 26 when indexed at the accumulator loading station 30 and the fingers 82 and 83 cooperating to strip the cartons from each lower mandrel 26 when indexed at Station 30.

The carton transfer carrier 46 (FIG. 5) has a single stripper finger 84 pivotally mounted thereon and disposed in position to engage the lowermost wall of the lower carton and move the carton from the aforementioned intermediate position under the lower accumulator conveyor 34 into the path of movement of the upper accumulator conveyor 36.

Since each of the stripper fingers are identical, the description of the stripper finger 79 (FIGS. 2 to 4) will suffice for all.

Figures 3, 4, 5:
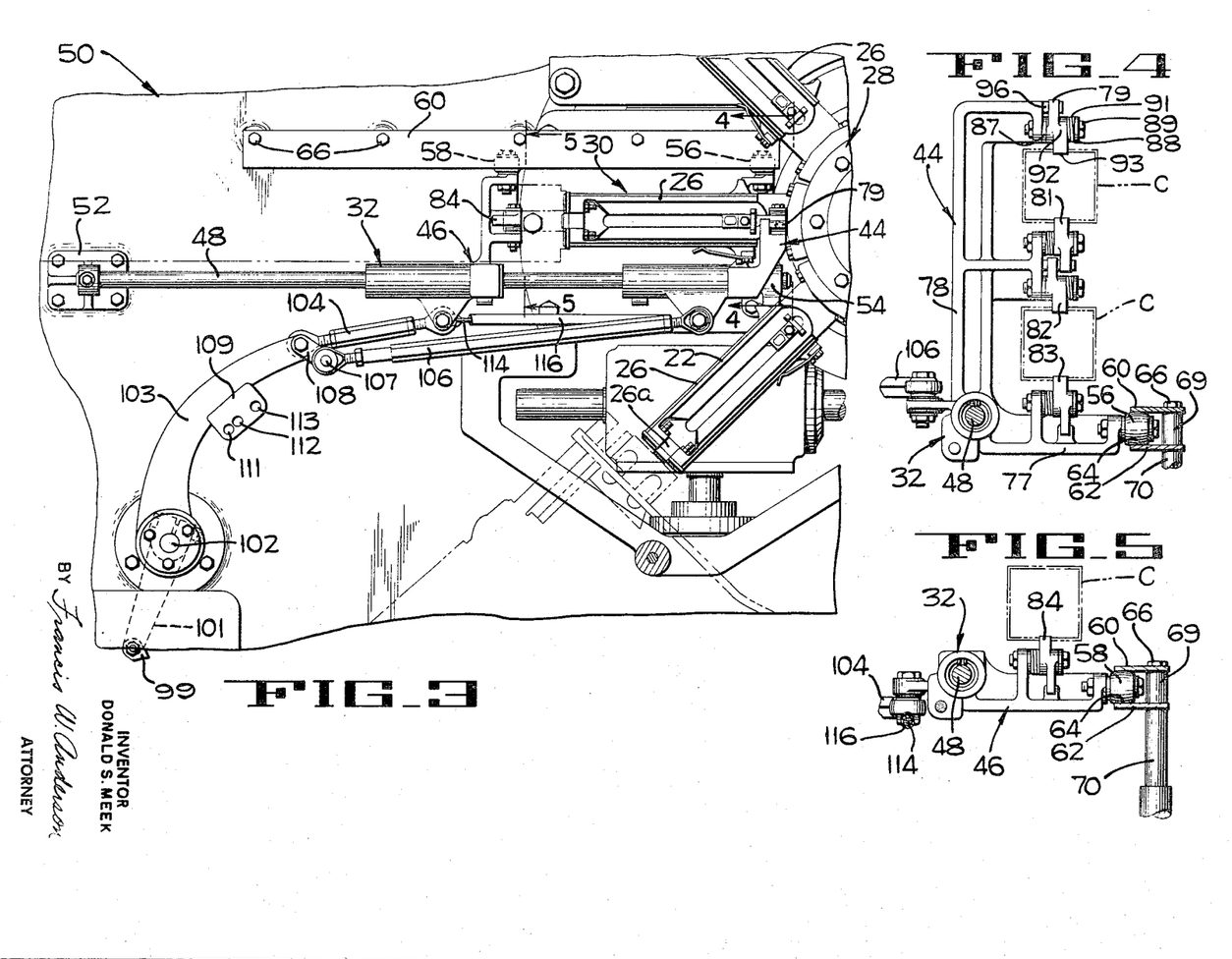
FIGURE 3 is a plan of a mandrel unloading and accumlator loading mechanism shown in the retracted position with the mechanism being adjusted to handle quart cartons.
FIGURE 4 is a vertical section taken along lines 4—4 of FIGURE 3 illustrating a mandrel unloading carrier.
FIGURE 5 is a vertical section taken along lines 5—5 of FIGURE 3 illustrating a carton transfer carrier.

The finger 79 is pivoted on a tubular bushing (not shown) which is disposed between collars 87 and 88 and is clamped rigidly thereagainst by a bolt 89 secured to the vertical arm 78 of the carrier 44. A torsion spring 91 has one end connected to the collar 88 and the other end connected to the hub 92 of the fingers 79 and urges the finger into the position shown in FIGURE 2 wherein a carton engaging surface 93 is disposed in position to engage a carton on the mandrel 26 at the loading station 30. An abutment surface 94 of the finger 79 is normally urged against a boss 96 on the vertical arm 78 of the carrier 44. Thus, when the unloading carrier 44 is moved to the left as viewed in FIGURE 3, the carton engaging surface 93 of the fingers 79, 81, 82 and 83 will engage adjacent edges of flaps of the top closure of the associated cartons C and will strip the cartons from the upper and lower mandrels 26 that are indexed at Station 30. It will be noted that the fingers 79, 81, 82 and 83 will pass through slots 26a formed in the mandrels 26 and will at no time contact any surface of the mandrels.

Prior to returning the reciprocable carrier 44 to the active stripping position shown in FIGURE 3, another mandrel 26 is indexed into the accumulator loading station 30. When the carrier 44 is returning to the active position, surfaces 93a (FIG. 10) of the fingers 79, 81, 82 and 83 will engage the cartons on the mandrels 26 and will pivot the fingers 79 and 81, against the urging of the torsion spring 91, to positions which will permit the fingers to slide over the upper and lower walls, respectively, of the cartons until the fingers move free of the carton and snap into the active position shown in FIGURES 2, 3, 4 and 5. It will be apparent that the finger 84 on the transfer carrier 46 operates in a similar manner during reciprocation of the carrier 46. Upon movement of the finger 84 from the position shown in FIGURE 10 to the position shown in FIGURE 3, the finger 84 is deflected downwardly and slides under the carton disposed in the intermediate position.

As will be described in more detail hereinafter, the reciprocable carriers 44 and 46 are reciprocated in timed relation with the movement of the turret 28 and with the movement of the accumulator conveyors 34 and 36 by drive means which includes a reciprocating link 99 (FIGS. 3 and 13) which is connected to one end of an arm 101 that is secured to a vertical extension of a pivot shaft 102. The shaft 102 (FIG. 3) is pivotally mounted in bearings secured to the frame 50 and has a carrier actuating arm 103 secured on its upper end.

Figure 10:
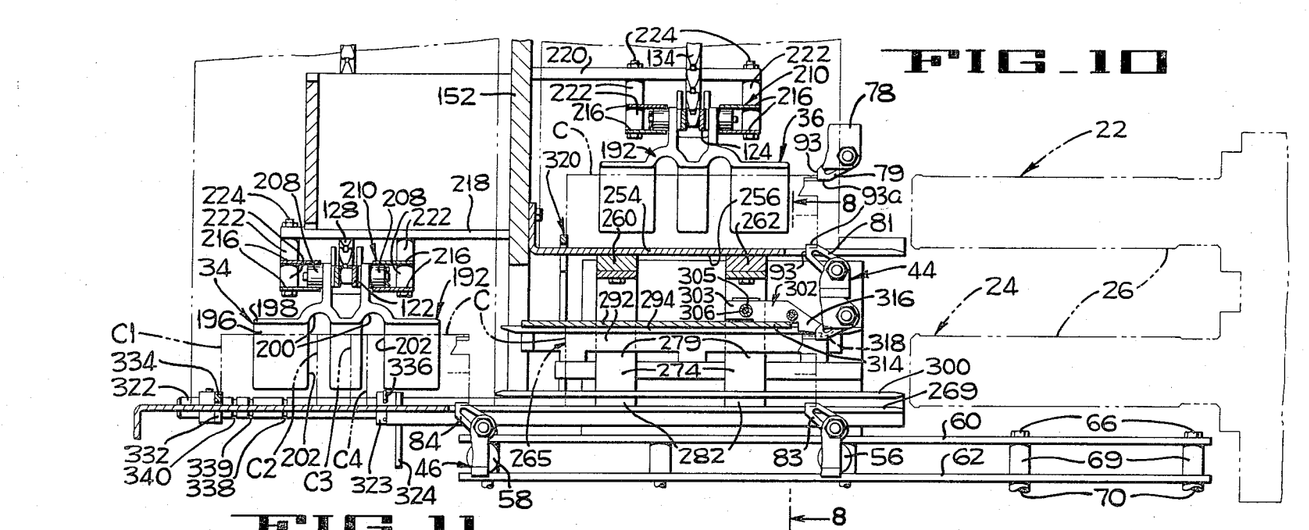
FIGURE 10 is a vertical section taken along lines 10—10 of FIGURE 1 illustrating the mandrel unloading and accumulator loading mechanism in an extended position.

The carton transfer carrier 46, which carrier need not be adjusted to accommodate the four different sizes of cartons which are handled by the accumulating apparatus 20, is pivotally connected to the free end of the carrier actuating arm 103 by an adjustable link 104. When the turret 28 and carton accumulating apparatus 20 are adjusted to handle quart sized cartons as indicated in FIGURES 3 and 10, the mandrel unloading carrier 44 is pivotally connected to one end of an adjustable link 106. The other end of the link 106 is connected by a pivot pin 107 to a yoke 108 formed adjacent the free end of the arm 103.

Although the transfer carrier 46 need not be adjusted to accommodate the several different sizes of cartons because the top closures of all sizes of cartons will be disposed at the same location when advanced by the carrier 46 into position to be loaded into the lower accumulator conveyor 34, it will be appreciated that the mandrel unloading carrier 44 must be adjusted to accommodate each size of carton so as to position the top closures thereof in a common location when the cartons are in position to be loaded into the accumulator conveyors 34 and 36 and also so as to terminate movement of the carrier to the right (FIG. 3) immediately after the fingers have moved past the cartons and have snapped into carton shipping position. Accordingly, a second yoke 109 is secured to the arm 103 and is arranged to selectively receive the pivot pin 107 in a one-half pint aperture 111, a one-third quart aperture 112, or in a pint aperture 113. Thus, when cartons other than quart size cartons are being processed, the link 106 is pivotally connected to the appropriate aperture 111, 112, 113 by the pin 107.

Since it is imperative that the vertical arm 78 of the mandrel unloading carrier 44 be moved outwardly of the free ends of the mandrels 26 prior to the indexing of the mandrels into the accumulator loading station 30, a protective chain link 114 covered by a flexible tube 116 is permanently fixed between the carriers 44 and 46. The chain link 114 is of sufficient length to draw the carrier 44 out of the path of movement of the mandrels 26 in the event an operator neglects to attach the free end of the link 106 to one of the yokes 108 or 109.

Figure 1:
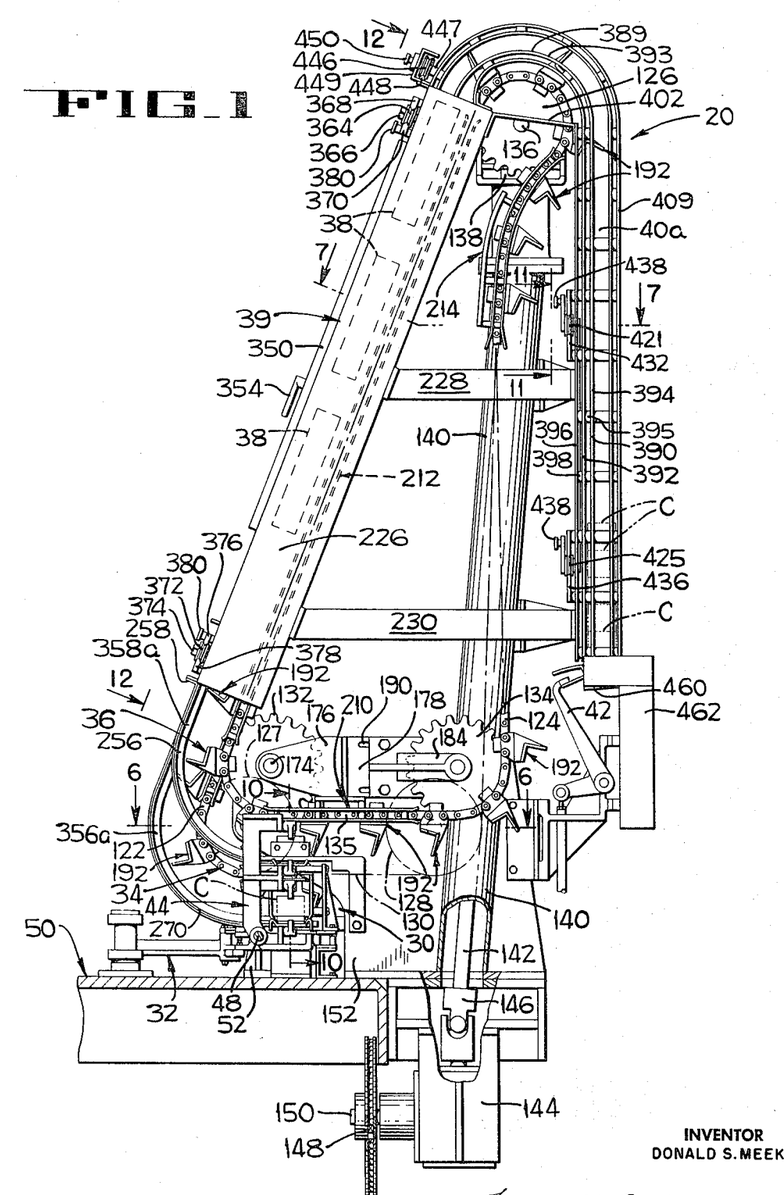
FIGURE 1 is a side elevation with parts broken away of the carton accumulating apparatus of the present invention.
Figure 6:
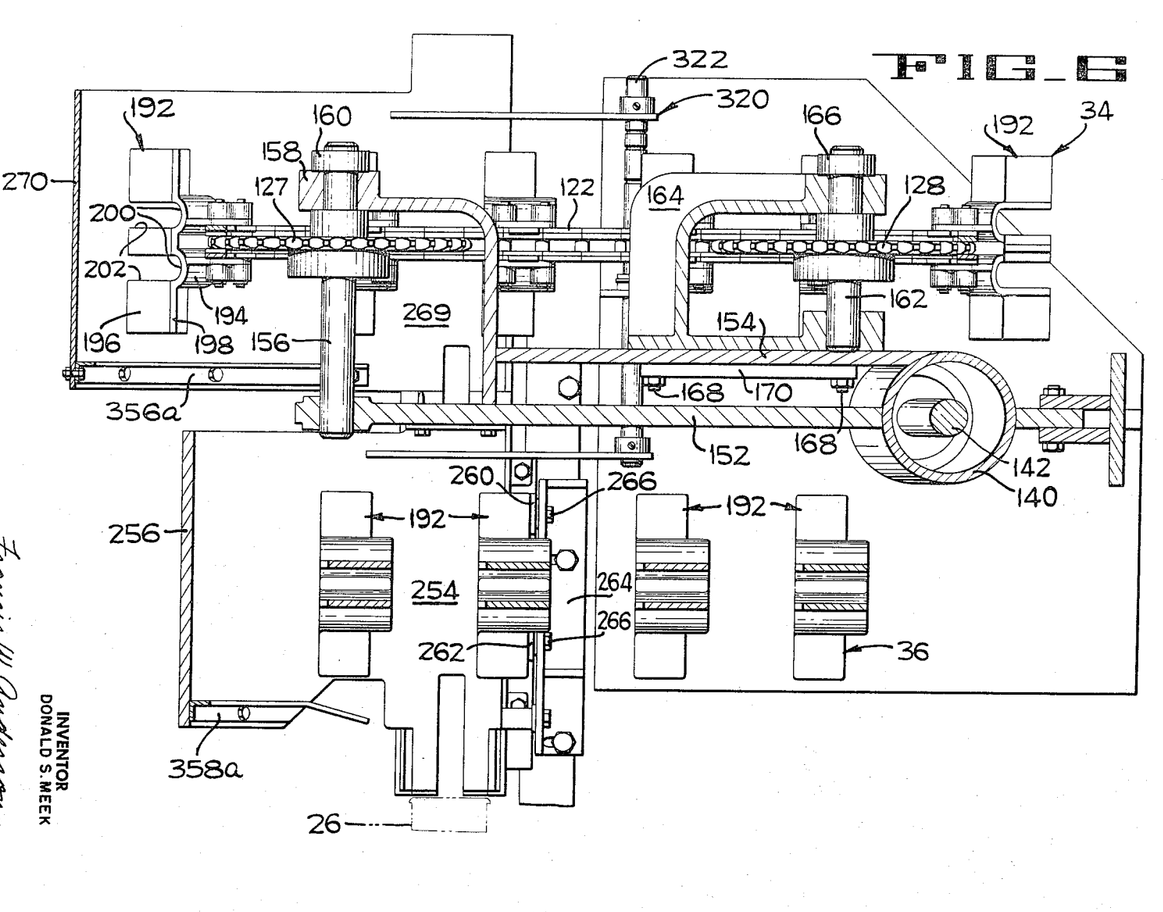
FIGURE 6 is an enlarged generally horizontally section taken along lines 6—6 of FIGURE 1, certain parts including a conveyor drive shaft being omitted.

The lower and upper accumulator conveyors 34 and 36 (FIGS. 1, 6 and 7) include endless chains 122 and 124, respectively, which are trained around a pair of spaced upper drive sprockets 126 (only one being shown in FIG. 1). The lower conveyor 34 is additionally trained around a pair of lower idler sprockets 127 and 128 to define a lower horizontal pick-up run 130, while the upper conveyor 36 is likewise trained around a pair of idler sprockets 132 (FIG. 2) and 134 to define a horizontal pick-up run 135. The upper drive sprockets 126 (FIG. 1) are keyed to opposite ends of the horizontal output shaft 136 of an upper right angle driving unit 138 which is rigidly secured to the upper end of a tubular column 140. The lower end of the tubular column 140 is rigidly secured to the frame 50 and has a drive shaft 142 extending therethrough and connected to the upper right angle driving unit 138 and to a lower right angle driving unit 144 by universal joints 146, only the lower universal joint being shown. The lower driving unit 144 is bolted to the frame 50 and is continuously driven by drive means to be described hereinafter, which drive means includes a sprocket 148 keyed to the input shaft 150 of the driving unit 144.

A vertically extending central web 152 (FIGS. 1, 2 and 6) and a vertically extending tangential web 154 (FIG. 6) are welded to the column 140. The idler sprocket 127 of the lower conveyor 34 is keyed on a stub shaft 156 which is journalled in the central web 152 and in an angle bracket 158 welded thereto and to the tangential web 154. A collar 160 holds the stub shaft from axial movement. Similarly, the sprocket 128 is keyed to a stub shaft 162 which is journalled in a yoke 164 and is held from axial movement by a set collar 166. The yoke 164 is adjustably connected to the web 154 by bolts 168 which extends through horizontal slots (not shown) in the web 154, and through holes in a clamping strap 170 which permits the yoke 164 to be adjusted horizontally and to be locked in adjusted position.

The idler sprockets 132 and 134 (FIG. 2) of the upper conveyor 36 are mounted in a similar manner as the sprockets 127 and 128 of the lower conveyor. The sprocket 132 is keyed to a stub shaft 174 (FIGS. 1 and 2) which is journalled in the central web 152 and in an angle bracket 176 welded to the web 152 and to a second tangential web 178 (FIG. 2).

The shaft 174 is held from axial movement by a collar 180 which is set screwed to the shaft 174. The idler sprocket 134 is keyed to a stub shaft 182 which is journalled in a yoke 184 and is held from axial movement by a collar 186 secured to the shaft 182. The yoke is mounted for horizontal adjustment by bolts 188 which extend through slots 190 in the web 178.

In order to engage cartons one at a time at the accumulator loading station 30 (FIG. 1) and to transport the cartons through the sterilizer 39 past the ultraviolet sterilizing units before releasing the cartons for gravitation into the associated vertical columns 40 and 40a (FIG.

7), each accumulator conveyor has a plurality of evenly spaced carton carriers 192 pivotally connected thereto. Each carton carrier 192 includes an angled body 194 having a pick-up plate 196 and a back-up plate 198. The back-up plate 198 includes a pair of arcuate grooves 200 in its carton contacting surface which grooves communicate with slots 202 formed in the pickup plate. The body 194 of each carrier 192 is pivotally connected to its associated conveyor by a pair of pins 204 which also serve to define pivot pins for certain of the links 206 of the conveyors 34 and 36. Rollers 208 are journalled on both ends of each elongated pins 204. The rollers ride along and are guided by horizontal track segments 210 (FIG. 10) adjacent the accumulator loading station 30, inclined track segments 212 (FIG. 7) in the sterilizer 39, and arcuate cut-back track segments 214 near the upper ends of the conveyor 34 and 36.

As indicated in FIGURE 10, the horizontal track segments 210 are each defined by a pair of rails 216 which are spaced from each other and from horizontal mounting plates 218 or 220 by tubular spacers 222. The rails 216 and spacers 222 are clamped to the associated mounting plates 218 or 220 by bolts 224, and the mounting plates are secured to the central web 152 as by welding.

Figure 7:
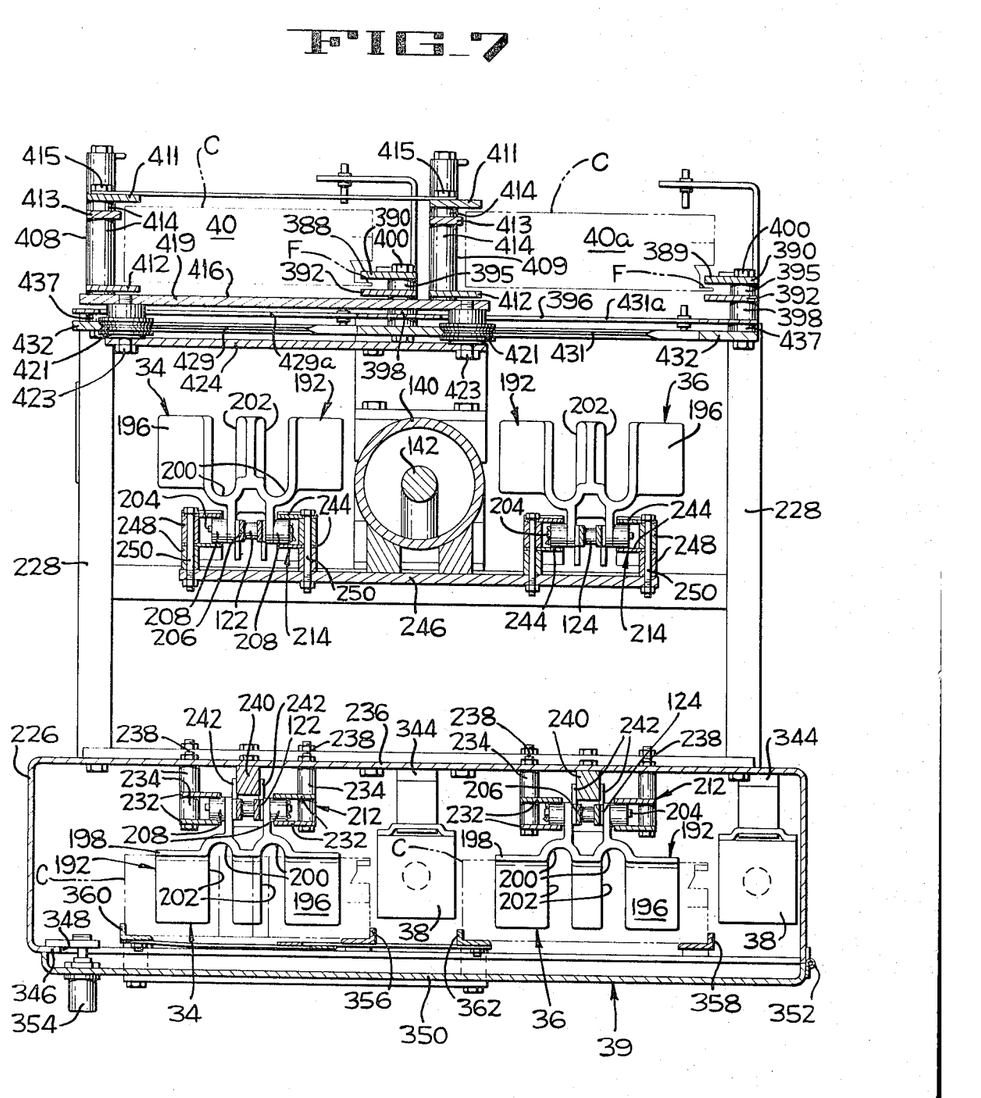
FIGURE 7 is an enlarged generally horizontal section taken along lines 7—7 of FIGURE 1.

The sterilizer 39, through which the inclined track segments 212 extend, includes an open ended generally rectangular housing 226 (FIGS. 1 and 7) which is bolted to an upper sub-frame 228 and a lower sub-frame 230. The sub-frames 228 and 230 are rigidly secured to the tubular column 140 as by welding. As shown in FIGURE 7, the inclined track segments 212 each includes pairs of rails 232 which are spaced from each other and from the sterilizing housing 226 by tubular spacers 234. The rails 232 and spacers 234 are secured to the inner wall 236 of the housing 226 by bolts 238. It will be apparent that the inclined track segments 212 engage the rollers 208 to maintain the carriers 192 in a predetermined path of movement and to prevent the carriers from moving toward or away from the inner wall 236 of the sterilizer 39 while the carriers are moving through the sterilizer. In order to prevent deflection of the carriers out of the predetermined path in a direction parallel to the wall 236, guide rails 240 are bolted to the wall 236 and are slidably engaged by pairs of guide lugs 242 formed on those links upon which the carriers 192 are secured.

The arcuate cut-back track segments 214 (FIGS. 1 and 7), which form an important part of the invention, are similar to the other track segments except that they include upper arcuate portions which serve to hold the conveyors 34 and 36 in engagement with their drive sprockets 126 so as to immediately withdraw the carriers 192 from the path of movement of the cartons as the cartons gravitate into the upper ends of the vertical accumulating guideways 40 and 40a. Each cut-back segment 214 comprises a pair of rails 244 that are spaced from each other and from a rail support plate 246 by tubular spacers 248. The rails and spacers are connected to the plate 246 by bolts 250, and the plate is rigidly secured to the tubular column 140 as by welding. The cut-back segments 214 serve the important function of rapidly withdrawing the carriers 192 from the path of movement of the cartons after the cartons pass over the upper drive sprockets.

Thus, the track segments 210, 212 and 214 cooperate with the rollers 208 to accurately guide the carriers 192 along their predetermined paths of movement when the carriers are in contact with the cartons. Since the cartons are empty and are quite light when being moved into and through the accumulator, it is necessary to provide carton supporting and guiding means at the loading station 30 for receiving cartons from the accumulator loading mechanism 32 and for accurately positioning the cartons for acceptance by the carriers 192 of the conveyors. It is also necessary to provide adjustable stop means at the loading station 30 for accommodating the several different sizes of cartons and for accurately locating the cartons in position to be engaged by the carriers 192.

Figure 8:
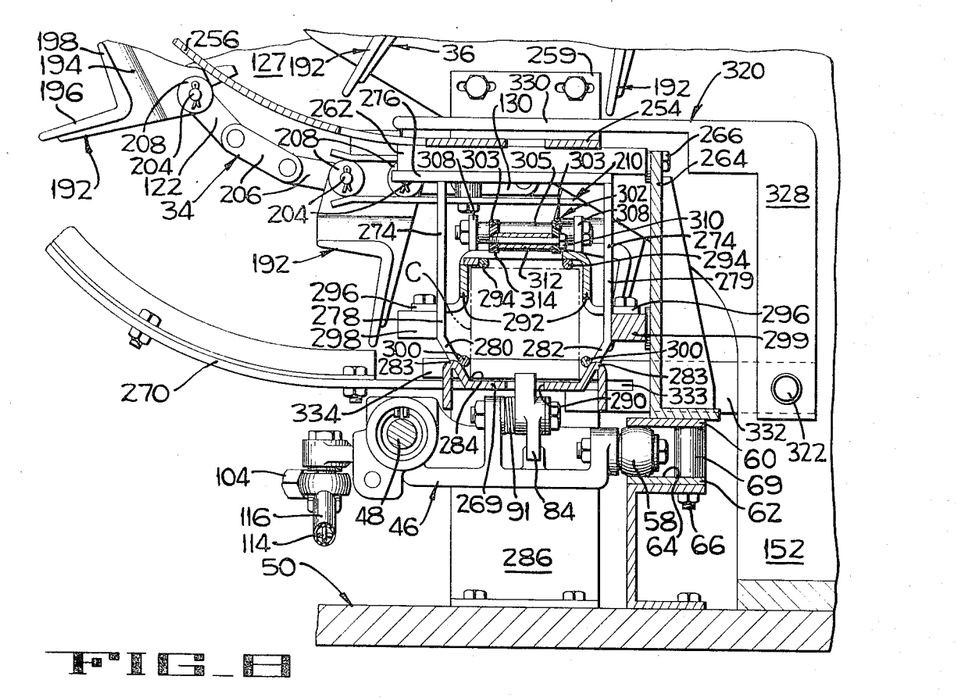
FIGURE 8 is an enlarged vertical section taken along lines 8—8 of FIGURE 10 illustrating certain carton transfer controlling mechanism.
Figure 9:
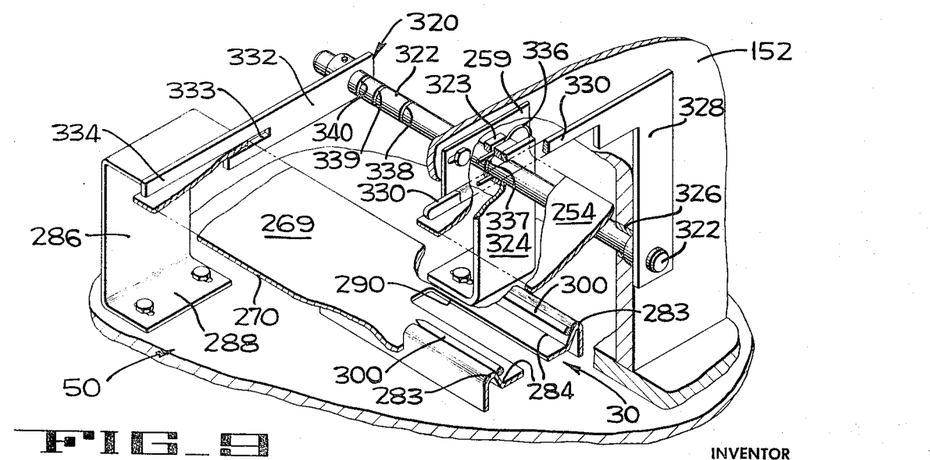
FIGURE 9 is an enlarged perspective of an adjustable carton stop mechanism shown in the quart position.

As mentioned in FIGURES 2, 6, 8, 9 and 10 each movement of the mandrel unloading carrier 44 from the position shown in FIGURE 2 to the position shown in FIGURE 10 strips a carton from the particular upper mandrel 26 that is indexed at the loading station 30. The carton is slidably received upon a horizontal end portion 254 of an upper arcuate transfer track 256 which has a flanged upper end 258 (FIG. 1) bolted to the sterilizing housing 226. The lower end portion of the transfer track 256 has an upturned flange 259 (FIGS. 8 and 9) which is bolted to the central web 152. A pair of horizontal bars 260 and 262 (FIGS. 2, 8 and 10) are welded to the undersurface of the transfer track 256 and are rigidly secured to a bracket 264 by capscrews 266 (FIGS. 2 and 8). The bracket 264 is bolted to the aforementioned track 64, which track is rigidly secured to the frame 50 of the machine.

Each intermittent movement of the mandrel unloading carrier 44 also strips a carton from the lower mandrel 26 at station 30 and places the carton in an intermediate position 265 (FIG. 10) below the upper conveyor 36. A second intermittent movement of the mandrel unloading carrier 44 and the carton transfer carrier 46 strips another carton from the lower mandrel at station 30 and places it below the path of movement of the upper conveyor 36 while the first mentioned carton is moved by the transfer carrier 46 from its intermediate position 265 below the path of movement of the upper conveyor 36 to a position in the path of movement of the lower conveyor 34.

The cartons stripped from the lower mandrels 26 are slidably received on a horizontal end portion 269 (FIGS. 8 and 10) of a lower arcuate carton transfer track 270 which has its upper flanged end 272 (FIG. 12) bolted to the sterilizing housing 226. As best shown in FIGURES 8 and 10, the end portion 269 of the lower transfer track 270 is supported by a pair of generally rectangular brackets 274. Each bracket 274 includes an upper horizontal member 276 that is bolted to an associated one of the bars 260 and 262, spaced downwardly extending strips 278 and 279 welded thereto, and downwardly converging positions 280 and 282 which are welded to the horizontal lower end portion 269 of the track 270. In order to strengthen the end portion 269 of the track 270 at the intermediate carton position 265, the end portion 269 includes upwardly flared walls 283 which are thereafter bent downwardly to define a carton accommodating channel 284. The side of the horizontal end portion 269 of the track 270 which is farthest disposed from the mandrels 26 includes a downwardly bent leg 286 (FIG. 9) having a flanged lower end 288 that is bolted to the frame 50. An elongated centrally disposed slot 290 is formed in the end portion 269 to accommodate the stripper finger 84 of the carton transfer carrier 46.

In order to control the position of each carton stripped from the lower mandrel 26, and inverted channel 292 (FIG. 8) is positioned above the carton and has a pair of carton engaging hold-down rails 294 welded thereto. A plurality of tabs 296 project outwardly of the channel 292 in position to be supported by and bolted to a pair of horizontal legs 298 and 299 that are welded to the vertical strips 278 and 279 of the rectangular brackets 274. Carton guide rails 300 are also welded to the flared walls 283 to aid in guiding the carton into the intermediate position. Thus, the lower cartons will be accurately guided into the intermediate position by cooperation between the channel 292, the hold-down rails 294 and the rails 300.

It will be appreciated that during the movement of the carton transfer carrier 46 from the intermediate position 265 shown in FIGURE 10 to the retracted position shown in FIGURE 3, the finger 84 will deflect downwardly against the urging of the torsion spring 91 and will slide under the carton previously deposited at the intermediate position. In order to prevent the intermediate carton from moving toward the right (FIG. 10) with the finger 84 during the above-mentioned retracting stroke, a latching device 302 (FIGS. 2, 8 and 10) is provided.

The latching device 302 includes a pair of hooking arms 303 which are spaced from each other and from mounting ears 308 by tubular spacers 305. The arms 303 are pivotally supported on a bolt 306 that extends through the arms and spacers and are supported by the spaced ears 308 which project upwardly from the channel 292. A capscrew 310 extends through one of the arms 303, through a spacer 312 and is screwed into the other arm 303 to provide the necessary spaced relationship between the arms. The arms 303 include flat abutment surfaces 314 which engage the upper surface of the channel 92 so as to normally hold generally V-shaped fingers 316 formed on the ends of the arms 303 in position to engage the upper right hand edge (FIG. 10) of the carton at the intermediate position and prevent the carton from moving toward the right (FIG. 10). A camming surface 318 is formed on the fingers 316 and faces upwardly and toward the mandrels 26 so as to permit cartons that are being stripped off the lower mandrels 26 to engage the surfaces 318 and lift the fingers upwardly thereby permitting the carton to be moved to the intermediate position. The fingers 316 then gravitate downwardly into the aforementioned hooking position.

Another important feature of the invention is the provision of an adjustable carton stopping mechanism 320 (FIGS. 6, 8, 9 and 10) for accommodating the several sizes of cartons which positively terminate the lateral movement of both the upper and lower cartons as they are moved by the loading mechanism 32 into position to be picked up by the upper conveyor 36 and lower conveyor 34, respectively. It will be understood that all cartons are the same in cross sectional dimension and vary only in their length. Thus, as indicated in FIGURE 10, the sealed bottom closures of quart, pint, one-third quart and one-half pint sized cartons are indicated by the lines C1, C2, C3 and C4, respectively.

The carton stopping mechanism 320 (FIG. 9) comprises an elongated rod 322 which is slidably received in a collar 323 on the upper end of a bracket 324 bolted to the frame 50, and in a bushing 326 fitted in the central web 152. An upward generally L-shaped stop arm 328 is rigidly connected to one end of the rod 322 by set screws and includes a horizontal finger 330 which projects over the horizontal end portion 254 of the upper arcuate transfer track 256 and is disposed below the path of movement of the carriers 192 of the upper conveyor 36.

A lower stop arm 332 is set screwed to the other end of the rod 322 and is slotted at 333 (FIG. 9) to receive an edge of the horizontal end portion 269 of the lower arcuate carton transfer track 270 thereby preventing rotation of the rod 322. The arm 332 includes a stop finger 334 which projects above the end portion 269 and is disposed below the path of movement of the carriers 192 of the lower conveyor 34. A hairpin lock 336 is received in the collar 323 and is selectively inserted in one of four annular grooves 337, 338, 339 and 340 in the rod 322 so as to lock the stop fingers 330 and 334 in the quart, pint, one-third quart and one-half pint positions, respectively. Thus, it will be apparent that by selectively engaging the hairpin lock 336 with the proper annular groove 337–340, both stop fingers 330 and 334 are simultaneously positioned to stop the particular pre-selected size of cartons being handled in position to be engaged and advanced into the sterilizer 39 by the carriers 192 of both conveyors 34 and 36.

Figure 12:
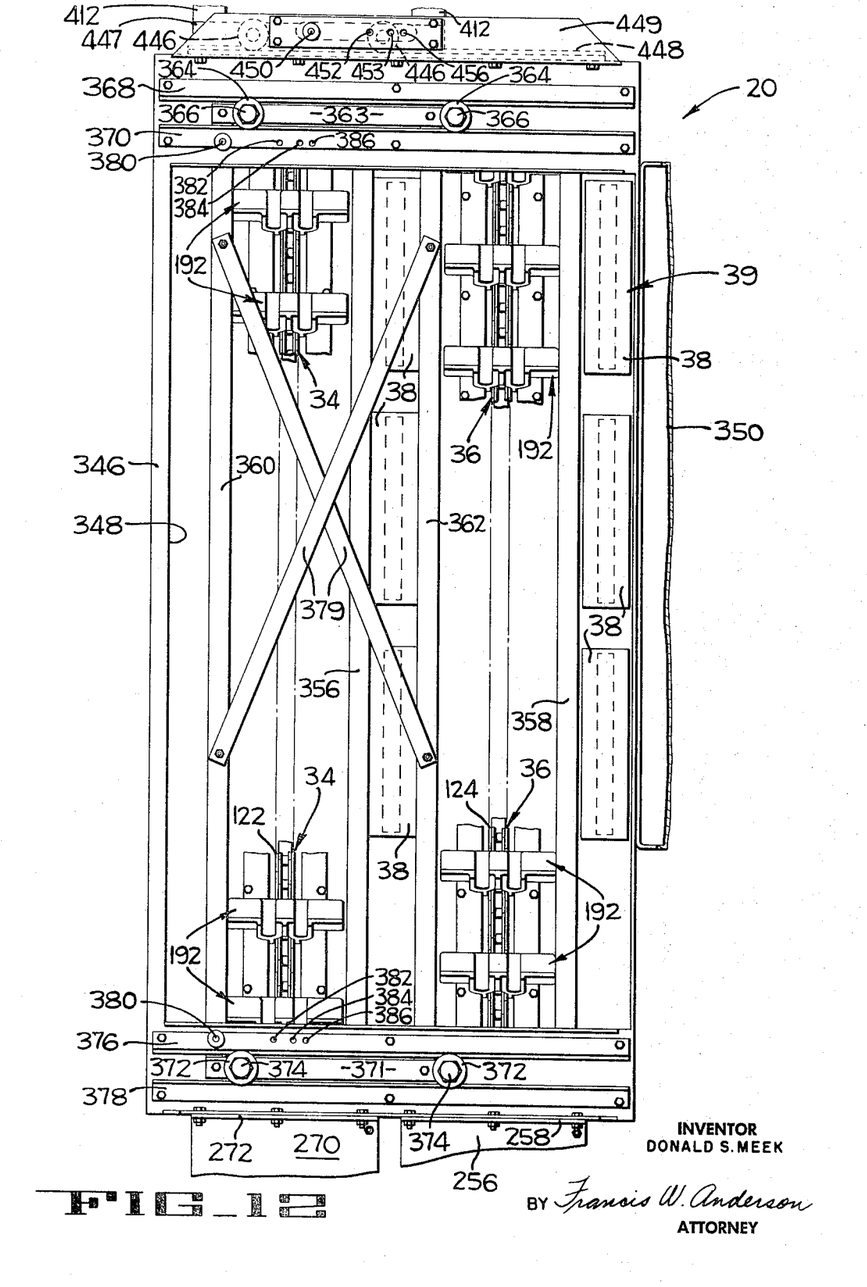
FIGURE 12 is an enlarged elevation taken looking in the direction of arrows 12—12 of FIGURE 1 illustrating guide tracks of a sterilizing section disposed in position to handle quart sized cartons.

As mentioned above, the sterilizer 39 includes an open ended generally rectangular housing 226 which includes an inner wall 236. The ultraviolet sterilizing units 38 are secured to brackets 344 (FIG. 7) that are welded to the wall 236. The brackets support the units 38 at points immediately adjacent the open ends of the cartons being moved therepast by the conveyors 34 and 36 so as to direct ultraviolet light into the cartons thereby sterilizing the cartons. As indicated in FIGURES 7 and 12, the sterilizer housing 226 also includes an outer wall 346 having a large access opening 348 therein which is normally closed by a door 350 hinged at 352 and latched at 354, said door 350 being shown closed in FIGURE 7 and open with parts cut away in FIGURE 12.

In order to maintain the open ends of the cartons immediately adjacent the sterilizing units 38, the open ends of the cartons being transported by the conveyors 34 and 36 are guided by fixed angle rails 356 and 358, respectively. The rails 356 and 358 are rigidly secured to the outer wall 346 of the housing 226, and include arcuate extensions 356a and 358a (FIG. 1) aligned therewith, which extensions are bolted to the arcuate tracks 270 and 256, respectively. Thus, the open ends of the cartons are engaged and guided by the rails 356 and 358 and their extensions immediately after being engaged and pushed out of the loading station 30 by the associated conveyor carriers 192 and until they have been advanced by the conveyors out of the upper open end of the sterilizer 39.

Transversely adjustable guide rails 360 and 362 are provided to engage the closed end walls C1, C2, C3 or C4 of the cartons and are adjustable so as to accommodate the several different sizes of cartons. The upper ends of the adjustable rails 360 and 362 are bolted to a horizontal bar 363 having grooved rollers 364 rotatably mounted thereon by bolts 366. The grooves of the rollers 364 are received in V-shaped surfaces of spaced horizontal tracks 368 and 370 that are bolted to the outer wall 346. Similarly, the lower ends of the rails 360 and 362 are bolted to a horizontal bar 371 having grooved rollers 372 rotatably mounted thereon by bolts 374. The grooves of the rollers are received in the V-shaped surfaces of spaced tracks 376 and 378 that are bolted to the outer wall 346. Crossed stabilizing bars 379 are bolted to the adjustable rails 360 and 362 and are welded at their point of intersection to add rigidity to the adjustable rails.

The adjustable rails are selectively locked into position to handle quart, pint, one-third quart and one-half pint cartons by removable pins 380. As positioned in FIGURE 12, the pins 380 are inserted into aligned holes (not shown) in the adjustable rail 360 and in the tracks 370 and 376. If pint, one-third quart or one-half pint cartons are to be handled, the rails 360 and 362 are moved toward the right, and the pins 380 are inserted in holes 382, 384 or 386, respectively, formed in the tracks 370 and 376, and into holes (not shown) formed in the rail 360. Thus, the cartons advanced through the sterilizer 39 by the conveyors 34 and 36 are held from transverse movement on the conveyor carriers 192 by cooperation between the rails 360, 356, and 362, 358, respectively.

After the cartons have been advanced through the sterilizer 39, they are moved upwardly over the drive sprockets 126 and thereafter are released from the carriers 192 of the conveyors 34 and 36 for immediate gravitation into the associated vertical columns or guideways 40 and 40a.

In order to maintain control of the cartons as they are being transferred from the sterilizer 39 into the guideways 40 and 40a, a pair of fixed tracks 388 and 389 are each defined by a pair of rails 390 and 392 (FIGS. 1 and 7) that are associated with each guideway 40 and 40a. Each pair of fixed rails includes an arcuate section 393 and a vertical section 394. As best shown in FIGURES 1 and 7, the rails are spaced from each other by a plurality of tubular spacers 395 and from a mounting plate 396 by tubular spacers 398. The mounting plate 396 is bolted to the sub-frames 228 and 230, and bolts 400 extend through the rails 390, 392, the spacers 395, 398, and the plate 396 so as to firmly clamp the rails in fixed position. The upper end of the plate 396 is stabilized by brackets 402 (FIG. 1) bolted thereto and to the inner wall 236 of the sterilizer housing 226. The arcuate section 393 of each pair of rails is concentric with the drive sprockets 126 and have their inlet ends flared outwardly and secured to the upper end of the housing 226 so as to receive a top closure end flap F therebetween as clearly indicated in FIGURE 7.

In order to guide the bottom closures of the cartons and to adapt the vertical columns 40 and 40a to selectively handle the four sizes of cartons, adjustable tracks 408 and 409 are adapted to receive the bottom closures of the cartons advanced by the conveyors 34 and 36, respectively. The tracks 408 and 409 each comprises a pair of wide rails 411 and 412 which engage opposite sides of the cartons adjacent the bottom closures thereof and prevent transverse movement of the cartons, and intermediate short rails 413 which engage the bottom surface of the cartons and cooperates with the associated stationary rails 390 and 392 to prevent longitudinal movement of the cartons as the cartons move therepast.

Figure 11:
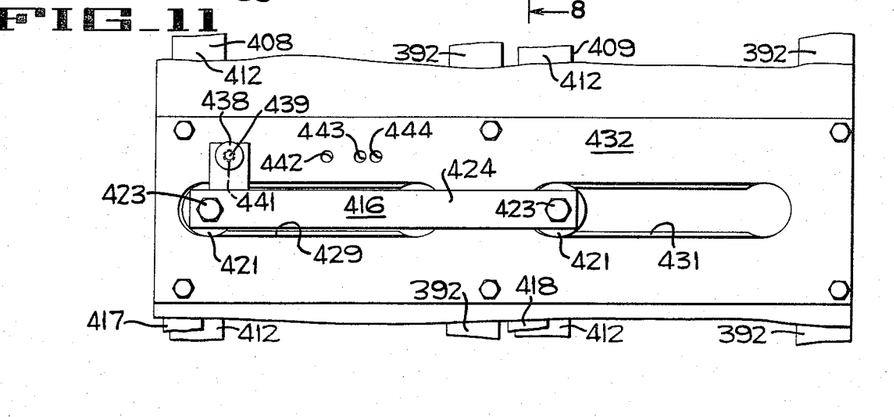
FIGURE 11 is a vertical section taken along lines 11—11 of FIGURE 1 illustrating the accumulator track adjustment means in a position adapted to handle quart size cartons.

The rails 411, 412 and 413 of each track 408 and 409 are held in parallel spaced relationship by a plurality of spacers 414 and cooperating bolts 415 which rigidly connect the tracks 408 and 409 to a track adjustment carrier 416 (FIGS. 7 and 11). The carrier 416 is rigidly constructed and includes a pair of spaced, vertical extending bars 417 and 418 rigidly secured to a pair of identical upper and lower horizontal bars 419, only the upper bar 419 being shown in FIGURE 7. An upper pair of grooved rollers 421 are journalled on capscrews 423 secured to opposite ends of the upper horizontal bar 419, and are disposed between the bar 419 and an upper latching bar 424 that is supported by the cap screws 423. A lower pair of grooved rollers 425, only one roller being shown in FIGURE 1, are mounted in a manner identical to the upper rollers 421 for supporting the lower end of the carrier 416. As best shown in FIGURES 7 and 11, the upper rollers 421 are slidably received in slots 429 and 431 in a horizontal plate 432 while the lower rollers 425 are similarly received in horizontal slots (not shown) in a plate 436 (FIG. 1). The plates 432 and 436 are connected by the aforementioned bolts 400 and cooperating spacers 437 to the plate 396 which is provided with slots 429a and 431a corresponding to the slots 429 and 431 to permit passage of a portion of the rollers therethrough.

A latching device 438, such as a spring loaded detent pin of any well known type, is supported by the upper and lower latch support bars 424. Each latching device 438 (only one being shown in FIG. 11) includes a pin 439 which is selectively received in holes 441, 442, 443 or 444 formed in the associated plates 432 and 436 to lock the track adjusting carrier 416 in the quart, pint, one-third quart, and one-half pint positions, respectively.

As indicated in FIGURE 1, the adjustable tracks 408 and 409 curve around the upper ends of the conveyors 34 and 36 and form continuations of the movable tracks 360 and 362, respectively, of the sterilizer 39.

Grooved rollers 446 (FIGS. 1 and 12) are journalled on a bar 447 that is secured as by bolting to the ends of the tracks 408 and 409. The rollers 446 are rotatably received on a V-shaped guide rod 448 which is bolted to a channel member 449 that is rigidly secured to the upper end of the sterilizer housing 226. When the adjustable tracks 408 and 409 are positioned to handle quart size cartons as indicated in FIGURE 7, a pin 450 is inserted in the aligned holes (not shown) in the bar 447 and in the channel member 449. When the tracks 408 and 409 are positioned to handle pint, one-third quart, and one-half pint size cartons the pin 450 is inserted in holes 452, 453, and 456, respectively, which are selectively aligned with the holes (not shown) in the bar 447.

As illustrated in FIGURE 1, the cartons are carried by the carriers 192 of the conveyors 34 and 36 over the associated drive sprockets 126 and are released by the carriers into the vertically disposed guideways 40 and 40a. The cut-back track segments 214 assure that the carriers 192 are withdrawn from the paths of movement of the following cartons so that the following cartons may gravitate vertically downwardly into the guideways 40 and 40a without contacting any of the carriers therebelow. If for some reason a carton should avoid free gravitational movement into the associated guideway 40 or 40a and wedge in the upper end of the guideway, the cut-back track segments 214 will cause the associated carrier to tap the carton thereby releasing it to gravitate downwardly in its guideway 40 or 40a.

The lower cartons in each guideway 40 and 40a are supported upon a substantially horizontal platform 460 of a chute 462, only the chute for the guideway 40a being shown. The pushers 42, only the pusher associated with the guideway 40a being shown, are then actuated upon demand from a carton receiving apparatus (not shown) for deflection of the lowermost carton from each guideway 40 and 40a allowing the remaining cartons therein to gravitate downwardly.

The pushers 42, chutes 462 and carton receiving apparatus (not shown) form no part of the present invention and may be of any suitable types such as that disclosed in the above-mentioned Vadas et al. application.

A drive train 465 (FIG. 13) is provided in order to drive the turret 28, accumulator loading mechanism 32, and accumulator conveyors 34 and 36 (FIG. 1) in timed relation. It will be understood that the pushers 42 operate independently of each other and also operate independently of the drive train 465.

Figure 13:
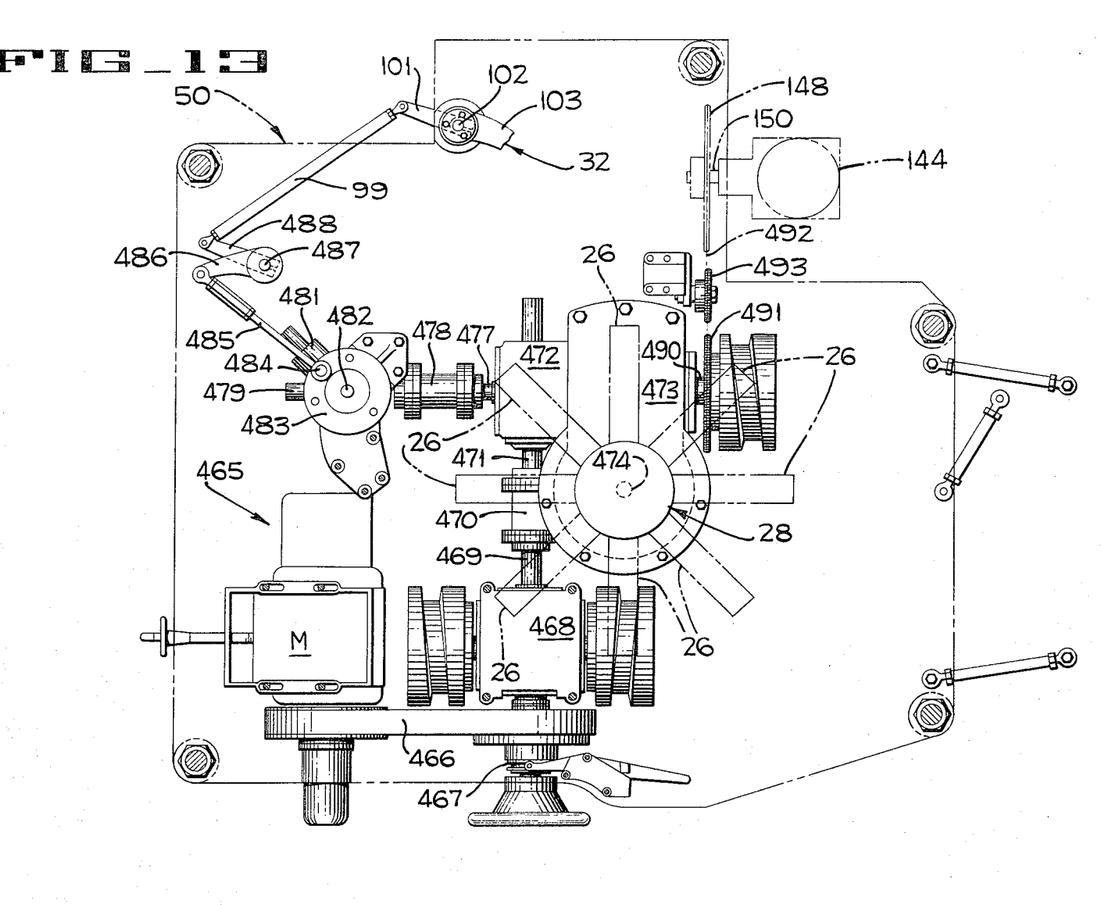
FIGURE 13 is a diagrammatic plan illustrating the drive mechanism for the accumulator and associated loading mechanism.

The drive train 465 receives power from a variable speed motor M which includes a magnetic brake to immediately stop the motor when deenergized. The motor M is connected by a belt drive 466 to an overload clutch 467, such as a Maxitorq clutch, Model No. 24, as marketed by Carlyle Johnson Company, 52 Main Street, Manchester, Connecticut. The clutch 467 drives a gear reducer 468. An output shaft 469 of the gear reducer 468 is connected by a flexible coupling 470 to the input shaft 471 of a driving unit 472 which includes an intermittent driving portion 473 that has an output shaft 474 which is connected to and intermittently drives the turret 28.

A continuously driven output shaft 477 of the driving unit 472 is connected by a flexible coupling 478 to a lower right angle gear box 479 which is in turn, coupled to an upper right angle gear box 481 that includes a continuously driven vertically extending output shaft 482. A crank disc 483 having a crank pin 484 projecting upwardly therefrom is keyed to the output shaft 482. A connecting rod 485 has one end pivotally connected to the crank pin 484 and has its other end pivoted to one end of a crank 486. The crank 486 is keyed to a vertical shaft 487 that is journalled in the frame 50 and has a second crank arm 488 keyed to the lower end thereof. The aforementioned link 99 that controls the reciprocal movement of the loading mechanism 32 is pivotally connected to the crank arm 488 and to the arm 101 of the mechanism 32. Thus, the accumulator loading mechanism 32 is reciprocated once for each intermittent movement of the turret 28.

A second continuously driven output shaft 490 of the driving unit 472 has a sprocket 491 secured thereto. The sprocket 491 is connected by a chain 492 to the aforementioned accumulator sprocket 148 that is keyed to the input shaft 150 of the lower right angle driving unit 144. A take-up sprocket 493 is provided to assure that the chain 492 remains tight. Thus, the accumulator conveyors 34 and 36 are driven in timed relation with the turret 28 and loading mechanism 32.

In the operation of the carton accumulating apparatus 20, cartons supported on the upper and lower series of mandrels 26 with their bottom closures sealed are indexed into the accumulator loading station 30. While indexed at the loading station, the mandrel unloading carrier 44 of the accumulator loading mechanism 32 strips the cartons from the upper and lower mandrels 26 at Station 30, and while the carriers 44 and 46 are in their extended positions illustrated in FIGURE 10, the turret indexes another pair of mandrels and cartons into the loading station 30. The carriers 44 and 46 of the accumulator loading mechanism 32 then move to the retracted positions illustrated in FIGURE 3 during which time the fingers 79, 81, 82, 83 and 84 pivot out of their carton stripping positions and, after moving past the cartons, snap back into their stripping positions.

The carton stripped from the upper mandrel is positioned on the upper transfer track 256 in position to be engaged by the carriers 192 of the upper conveyor 36. This upper carton is moved out of the loading station 30 by the conveyor 36 prior to the next intermittent movement of the accumulator loader 32. The carton that had previously been stripped from the lower mandrel is disposed on the lower carton transfer track 270 in the intermediate position and is positively held in this intermediate position by the fingers 316 of the latching device 302 during movement of the loading mechanism 32 to the retracted position shown in FIGURE 3. During the next carton stripping stroke of the loading mechanism 32, the mandrel unloading carrier 44 strips the cartons from the upper and lower mandrels 26 at Station 30 as above described. At the same time, the finger 84 of the transfer carrier 46 engages and moves the carton from the intermediate position on the lower carton transfer track 270 to a position in alignment with the carriers 192 of the lower accumulator conveyor 34.

The adjustable carton stopping mechanism 320 is adjusted, prior to placing the apparatus 20 in operation, to stop the cartons of the size being handled in position to be engaged and carried by the conveyors 34 and 36 to the sterilizer 39. After the cartons of the particular size being handled are advanced through the sterilizer 39 they are received by the adjustable and stationary tracks 408, 388 and 409, 389 and are moved upwardly over the drive sprockets 126. The cartons then gravitate downwardly into the associated guideways 40 and 40a and are accumulated in vertical columns resting upon the upper surfaces of the platforms 460 of the chutes 462. The cut-back track segments 214 assure that the carriers 192 will be withdrawn from the paths of movement of the cartons that gravitate from the following carriers 192. The lowermost cartons of the so accumulated cartons are then dispensed from each guideway 40 and 40a upon demand by the pushers 42 or similar structure.

From the foregoing description it is apparent that the carton accumulating device of the present invention includes adjustable means for accurately depositing cartons in positions to be engaged by a pair of spaced conveyors. The apparatus also includes means for accurately guiding the cartons along a pair of predetermined paths and for thereafter releasing the cartons for gravitation into a spaced pair of vertical carton accumulating guideways which are adjustable to handle cartons of different sizes.

While one embodiment of the present invention has been shown and described, it will be understood that various changes and modifications may be made without departing from the spirit of the invention or the scope of the appended claims.

The present invention and manner in which the same is to be used having thus been described, what is claimed as new and desired to be protected by Letters Patent is:

1. A carton accumulating apparatus comprising indexing means for indexing cartons into a loading station, carton supporting and guiding means including a portion disposed in position to receive the cartons at said loading station and including a vertically extending accumulating guideway, stripping means for removing the cartons from said indexing means and placing the cartons on said supporting and guiding means, conveying means for receiving and advancing the cartons along said supporting and guiding means and releasing the cartons for immediate gravitation into said vertical accumulating guideway, and means for removing the lowermost carton from said accumulating guideway.

2. A carton accumulating apparatus comprising indexing means for intermittently indexing pairs of upper and lower cartons positioned at different elevations into a loading station, upper carton supporting and guiding means including a portion disposed in position to receive the upper cartons at said loading station and including a first vertically extending accumulating guideway, lower cartons supporting and guiding means including a portion disposed in position to receive the lower carton at said loading station and including a second vertically extending accumulating guideway, stripping means for removing the upper and lower cartons from said indexing means and placing them on said upper and lower carton supporting the guiding means, first conveying means for receiving and advancing the upper cartons along said upper supporting and guiding means and releasing said upper cartons for immediate gravitation into said first vertical accumulating guideway, second conveying means for receiving and advancing the lower cartons along said lower supporting and guiding means and releasing said cartons for immediate gravitation into said second accumulating guideway, and means for removing the lowermost carton from each accumulating guideway.

3. A carton accumulating apparatus according to claim 1 wherein said carton supporting and guiding means is adjustable to accommodate cartons of different sizes, and means for locking said carton supporting and guiding means in adjusted position.

4. An apparatus according to claim 1 and additionally including stop means disposed over said supporting and guiding means at said loading station for stopping the cartons being moved onto said supporting and guiding means by said stripping means in position to be accepted by said conveying means.

5. An apparatus according to claim 4 wherein said conveying means includes an endless chain, a plurality of equally spaced carriers on said chain with each carrier adapted to receive a carton at said loading station and to transport the carton to a position adjacent the upper end of said accumulating guideway, and cut-back means adjacent the upper end of said accumulating means for rapidly withdrawing the carriers from the path of movement of the carton released into said accumulating guideway, said cut-back means being adapted to cause said carriers to engage and release any cartons which resist free gravitational movement into said guideway.

6. An apparatus according to claim 2 wherein said stripping means is intermittently operated, said stripping means including a first carrier for engaging and simultaneously stripping an upper carton and a lower carton from said indexing means, said upper carton being moved by said first carrier into position to be engaged by said first conveying means, said lower carrier being moved by said first carrier to an intermediate position, and a second carrier included in said stripping means and arranged upon a subsequent stroke of said reciprocal stripping means to engage and advance the lower carton from said intermediate position into position to be engaged by said second conveying means.

7. An apparatus according to claim 6 wherein said carriers each include at least one stripper finger disposed in position to engage and move the cartons away from said indexing means during a carton stripping stroke, and which will yield and slide against an outer surface of the cartons during a return stroke, and pivotally mounted carton lodging means disposed in position to contact the lower carton when in said intermediate position and arranged to permit the movement of the lower carton therepast during the stripping stroke and to positively prevent movement of the lowermost carton therepast during the return stroke.

8. An apparatus according to claim 7 wherein said carton supporting and guiding means are adjustable to accommodate cartons of different sizes, first stop means disposed in position to stop the first carton in position to be engaged by said first conveyor, second stop means disposed in position to stop the second carton in position to be engaged by said second conveyor, means interconnecting said first and second stop means for adjustment to accommodate cartons of different sizes, and means for latching said supporting and guiding means and said stop means in preselected positions of adjustment.

9. An apparatus according to claim 8 and additionally comprising an endless conveyor chain in each conveying means, a plurality of equally spaced carriers on each chain with each carrier adapted to receive a carton at said loading station and to transport the carton to a position adjacent the upper end of the associated accumulating guideway, and cut-back means adjacent the upper ends of said guideways and cooperating with said chains for rapidly withdrawing the carriers from the paths of movement of the cartons released into said accumulating guideways, said cut-back means being arranged to cause said carriers to engage and push downwardly any carton which avoids free gravitational discharge from said carriers and becomes bound in the upper ends of said guideways.

References Cited by the Examiner
UNITED STATES PATENTS
2,749,687   6/1956   Imbs _______________ 53—59

ANDRES H. NIELSEN, *Primary Examiner.*

R. E. AEGERTER, *Asssitant Examiner.*